United States Patent
Perkinson et al.

(10) Patent No.: US 9,512,728 B2
(45) Date of Patent: Dec. 6, 2016

(54) SIMPLIFIED PROPELLER BALANCING SYSTEM AND METHOD

(71) Applicant: HAMILTON SUNDSTRAND CORPORATION, Windsor Locks, CT (US)

(72) Inventors: Robert H. Perkinson, Stonington, CT (US); David R. Danielson, Suffield, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 728 days.

(21) Appl. No.: 13/871,371

(22) Filed: Apr. 26, 2013

(65) Prior Publication Data

US 2014/0322009 A1    Oct. 30, 2014

(51) Int. Cl.
| | |
|---|---|
| F01D 5/16 | (2006.01) |
| B64C 11/00 | (2006.01) |
| F16F 15/32 | (2006.01) |
| G01M 1/36 | (2006.01) |
| F01D 5/02 | (2006.01) |

(52) U.S. Cl.
CPC .............. *F01D 5/16* (2013.01); *B64C 11/008* (2013.01); *F01D 5/027* (2013.01); *F16F 15/32* (2013.01); *G01M 1/36* (2013.01); *Y02T 50/67* (2013.01)

(58) Field of Classification Search
CPC .............. F01D 5/027; F01D 5/10; F01D 5/16; F01D 25/04; F04D 29/662; F04D 29/666; F04D 29/329; F04D 29/668; B64C 11/008; B64C 27/008; B64C 27/028; B64C 11/02; F05D 2260/96; F16F 15/32; F16F 15/363; G01M 1/36; Y02T 50/671
USPC .................................. 73/469; 416/145, 500
See application file for complete search history.

(56) References Cited

U.S. PATENT DOCUMENTS

| | | | | |
|---|---|---|---|---|
| 1,678,887 | A | * | 7/1928 | Trumpler ................ G01M 1/04 73/469 |
| 1,730,019 | A | * | 10/1929 | Trumpler ................ G01M 1/04 73/469 |
| 2,164,900 | A | * | 7/1939 | Campbell ............... G01M 1/36 451/343 |
| 5,676,025 | A | | 10/1997 | Lulay |
| 6,618,646 | B1 | | 9/2003 | Dyer |
| 6,883,373 | B2 | | 4/2005 | Dyer |
| 7,155,973 | B2 | | 1/2007 | Dyer |
| 8,360,728 | B2 | | 1/2013 | Hildebrand et al. |
| 8,376,866 | B2 | | 2/2013 | Iizuka et al. |
| 2004/0180726 | A1 | | 9/2004 | Freeman et al. |
| 2009/0306829 | A1 | | 12/2009 | Hildebrand et al. |
| 2011/0197703 | A1 | | 8/2011 | Badre-Alam et al. |
| 2012/0269626 | A1 | | 10/2012 | Winzenz et al. |

* cited by examiner

*Primary Examiner* — Craig Kim
*Assistant Examiner* — Julian Getachew
(74) *Attorney, Agent, or Firm* — Carlson, Gaskey & Olds, P.C.

(57) ABSTRACT

A propeller balancing device includes at least one stationary outer disc and a drive wheel arranged adjacent to the outer disc. The drive wheel includes magnets arranged at the periphery. A balancing weight is arranged in a groove formed in one of the outer disc or the drive wheel. A propeller including the propeller balancing device and a method of balancing a propeller are also disclosed.

16 Claims, 6 Drawing Sheets

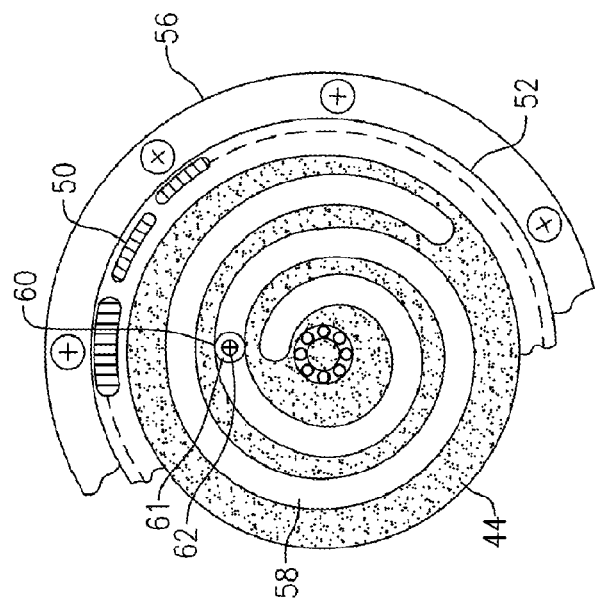
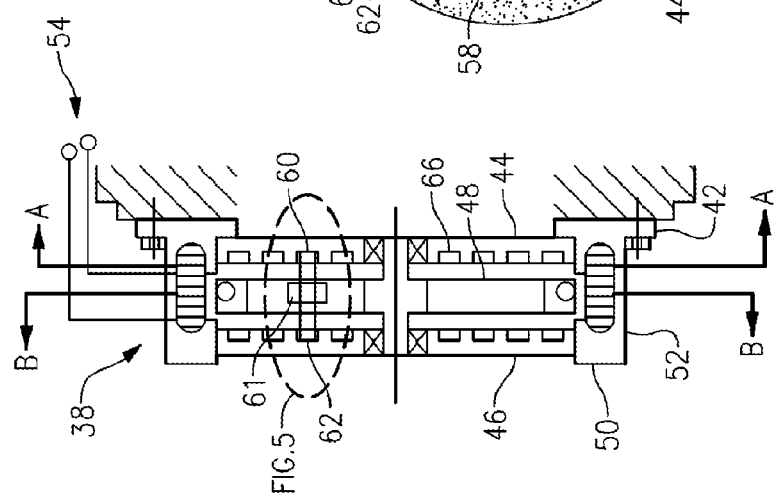
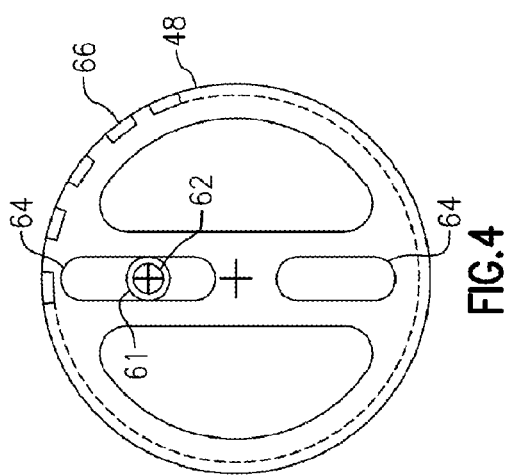
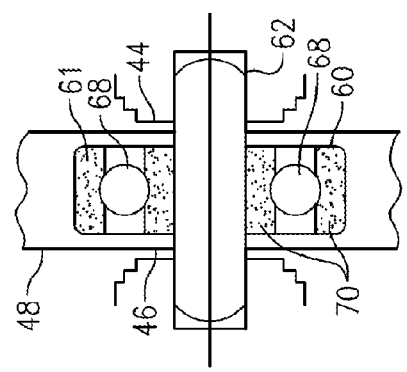

SIMPLIFIED PROPELLER BALANCING SYSTEM AND METHOD

BACKGROUND

This disclosure relates to a balancing system and method for adjusting the location of weights to correct for an imbalance on a propeller rotor.

Propeller rotors typically include a plurality of propeller blades which can be driven as a unit about a central axis. The blades have airfoils and roots which are mounted within a hub structure. Propeller rotors are subject to vibration and imbalance. Balance weights may be added to the rotor to correct the imbalance.

Traditionally, aircraft propellers are balanced by the addition of one or more balance weights to the rim of a circular partition of the propeller rotor known as a bulkhead. The angular location and mass of the balance weight is typically determined by the measurement of the vibratory response of an engine, reduction gearbox and propeller system to the application of trial balance weights. The vibration measurements are typically made by recording an electrical response of an accelerometer or similar device mounted on a stationary structure in close proximity to the plane of the propeller. Recording equipment may or may not be permanently installed on the aircraft.

This is a time consuming and inefficient method because it requires test runs and/or test flights where measurements are taken, followed by engine shutdowns where weights are added, removed, or relocated. Furthermore, only one balance solution may be installed for any given flight. Since propeller-induced unbalance typically varies with flight conditions, the present system is not optimal.

SUMMARY

A propeller balancing device includes at least one stationary outer disc and a drive wheel arranged adjacent to the outer disc. The drive wheel includes magnets arranged at the periphery. A balancing weight is arranged in a groove formed in the at least one outer disc or the drive wheel. A propeller including the propeller balancing device and a method of balancing a propeller are also disclosed.

BRIEF DESCRIPTION OF THE DRAWINGS

The disclosure can be further understood by reference to the following detailed description when considered in connection with the accompanying drawings wherein:

FIG. 2 schematically illustrates a detail view of a propeller rotor balancing system.

FIG. 3 schematically illustrates a cross section of the propeller rotor balancing system of FIG. 2.

FIG. 4 schematically illustrates an alternate cross section of the propeller rotor balancing system of FIG. 2.

FIG. 5 schematically illustrates a detail view of a balancing weight of the propeller rotor balancing system of FIG. 2.

DETAILED DESCRIPTION

Figure 1:
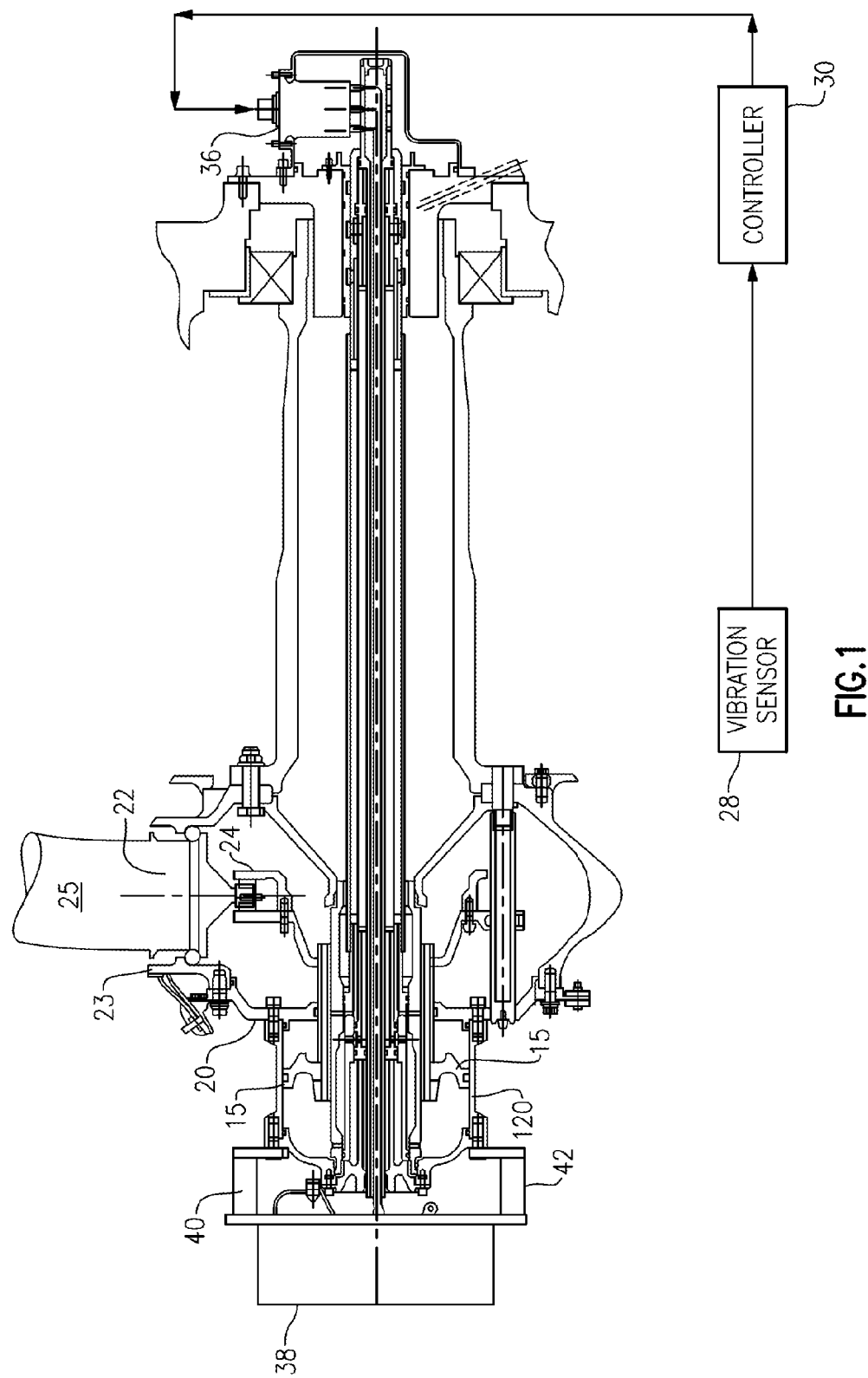
FIG. 1 schematically illustrates a propeller rotor.

A propeller assembly 20 is illustrated in FIG. 1. A plurality of blades 22 are mounted within mount locations 23. A cylinder 120 receives a piston 15 for moving a pitch change mechanism 24, which is operable to change the pitch or angle of an airfoil 25 associated with the blade 22.

The propeller assembly 20 is provided with a vibration sensor 28 which communicates with a controller 30. The controller 30 communicates with an electrical brush commutation assembly 36. A balancing device 38 is mounted to the propeller rotor 20 by mounting brackets 40, 42. The balancing device 38, vibration sensor 28, and controller 30 may be permanently installed on the propeller assembly 20 and a stationary portion of and aircraft airframe in one example.

Referring to FIG. 2, the balancing device 38 includes first and second outer discs 44, 46 and a drive wheel 48 which together form an electrical detent motor. A series of electrical coils 50 are arranged in an outer ring 52 which is located about the periphery of the outer discs 44, 46. In one example, the electrical coils 50 are equally spaced within the outer ring 52. The electrical coils 50 receive signals from an electrical input 54.

FIG. 3 shows a cross section of the balancing device 38 along the line A-A (FIG. 2). The first and second outer discs 44 and 46 (not shown) and the outer ring 52 are mounted within a mounting frame 56. The outer discs 44, 46 include matching grooves 58. In the example shown, the groove 58 is spiral shaped. In another example, the groove 58 may have another shape which allows a balancing weight 60 arranged in the groove 58 to advance in an outward radial direction with one direction of rotation of the drive wheel 48.

In the example shown in FIG. 3, the spiral groove 58 of the first outer disc 44 is a mirror image of the spiral groove 58 of the second outer disc 46 (not shown). The spiral groove 58 receives the balancing weight 60. In the example of FIGS. 2-5, the balancing weight is a ball bearing assembly 61 with a pin 62 arranged through the center. In another example, the balancing weight 60 may be another kind of weight.

FIG. 4 shows a cross section of the balancing device 38 along the line B-B (FIG. 2). The drive wheel 48 includes slots 64 which receive the ball bearing assembly 61 and pin 62. The drive wheel 48 also includes magnets 66 around a perimeter. The magnets 66 may be axially aligned with the electrical coils 50 of the first and second outer discs 44, 46.

In another example, the groove 58 and electrical coils 50 may be arranged in the drive wheel 48 and the magnets 66 and slots 64 may be arranged in the outer discs 46, 48.

FIG. 5 shows a detail view of the example balancing weight 60. The ball bearing assembly 61 includes balls 68 supported on bearing races 70 and pin 62.

Sequential energizing of the electrical coils 50 by the electrical leads 54 induces repulsion from the magnets 66, which causes clockwise or counterclockwise rotation of the drive wheel 48, depending on the energizing sequence. The balancing weight 60 moves through the groove 58 as the drive wheel 48 rotates. Rotation of the drive wheel 48 adjusts the radial displacement of the balancing weight 60 within the slot 64 and also its angular displacement with respect to the propeller assembly 20 as the balancing weight 60 moves through the groove 58.

When the balancing weight 60 is in the desired location within the groove 58, the electrical coils 50 are de-energized and the repulsive force acting on the magnets dissipates. The disc 48 is held in position by the residual magnetic detent forces commonly known in the design of electrical rotary actuation devices. This "locks" the drive wheel 48 and balancing device 60 in place. The desired location of the balancing weight 60 may, in one example, minimize the vibrations detected by the vibration sensor 28. The desired location may be determined by the controller 30 using information from the vibration sensor 28.

In one example, the balancing device 38 requires only one electrical input 54, which may be integrated into existing electrical interfaces to facilitate communication between rotating and non-rotating parts of the propeller assembly 20. For instance, the electrical input 54 may be integrated within a blade de-icing slip-ring interface.

The balancing device 38 provides a simple and relatively lightweight mechanical balancing system for a propeller assembly 20 which may be permanently installed on an aircraft or other vehicle and activated to provide the appropriate balancing solution for various flight phases. That is, the balancing device 38 may be installed in the aircraft and operable during flight.

The balancing weight 60 may be located in the most inboard radial position of the spiral groove 58 in an inactive state when no balancing is required. When vibrations are detected by the vibration sensor 28, a balancing sequence may be activated. Alternatively, the balancing sequence may be manually activated. Vibrations within a propeller assembly 20 may be measured by the phase angle between the peak vibration and a point on the propeller assembly 20 and by the amplitude of vibrations. The controller 30 activates the motor 36 to energize or de-energize the electrical inputs 54 to the balancing device 38, which causes the appropriate rotation of the drive wheel 48 and displacement of the balancing weight 60 to minimize vibrations as measured by the vibration sensor 28.

Figure 6A:
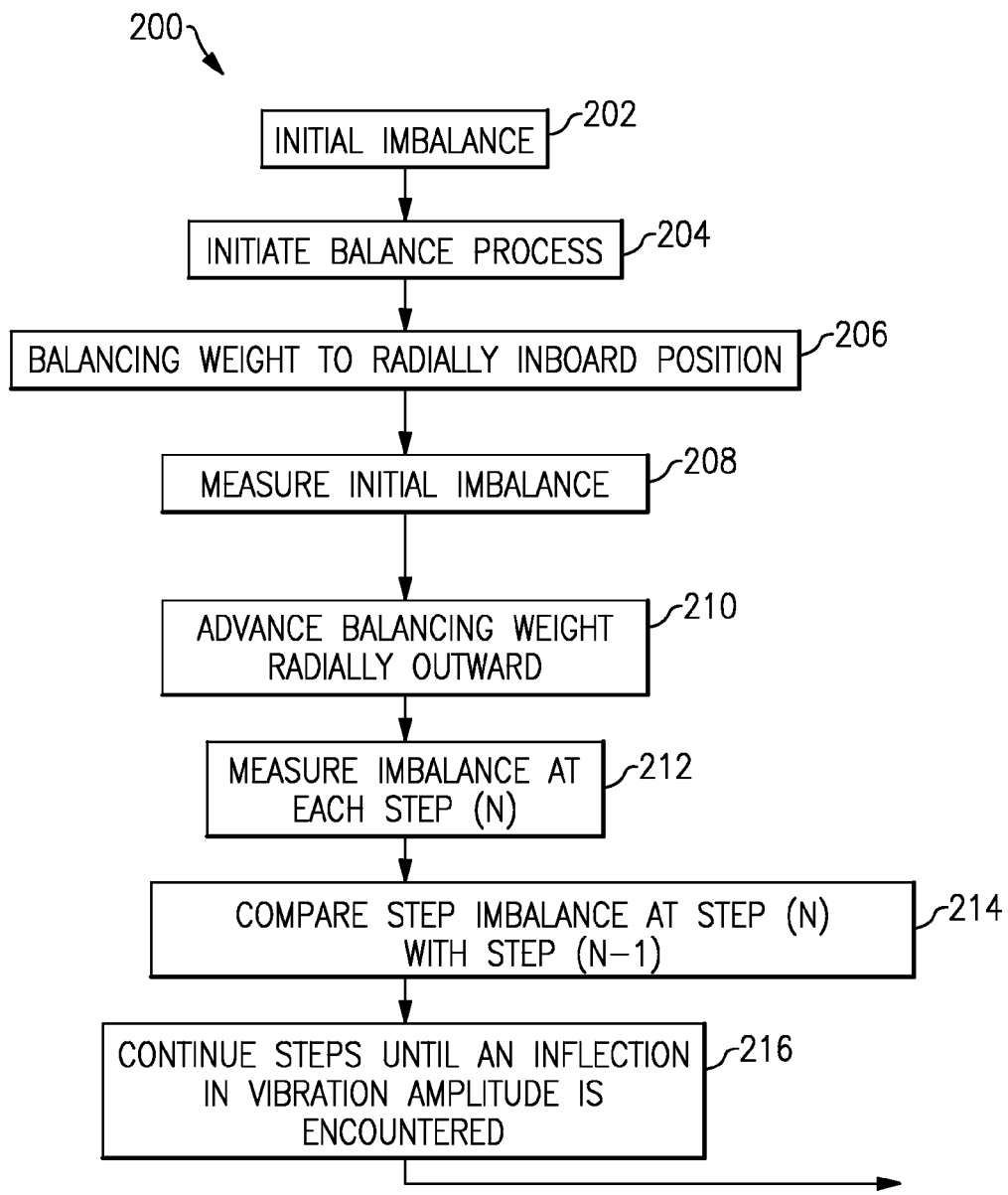
FIG. 6a illustrates a flow diagram of initial steps of a coarse balance correction method.
Figure 6B:
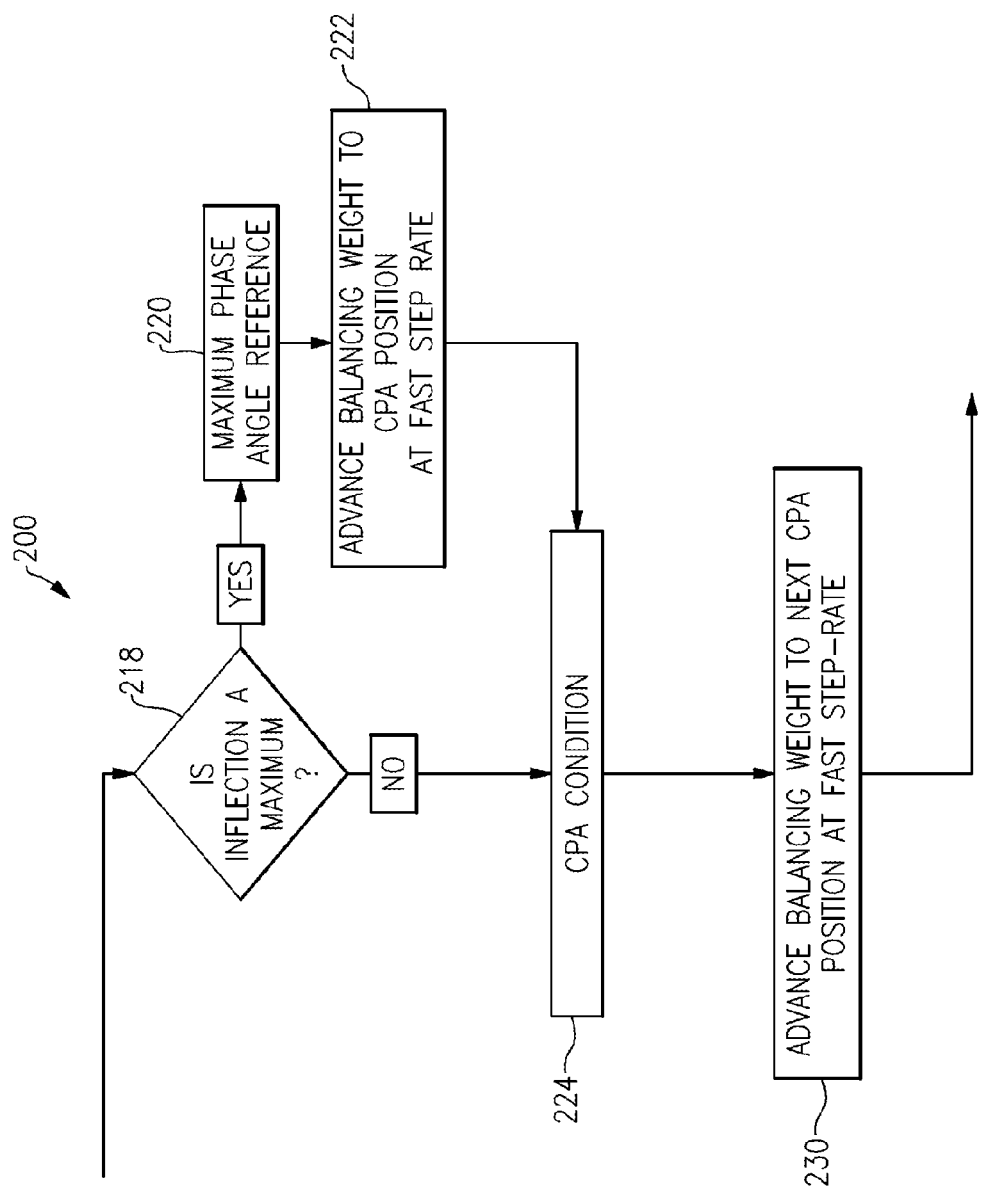
FIG. 6b illustrates a flow diagram of correction phase angle (CPA) positioning of the balancing weight in the coarse balance correction method.
Figure 6C:
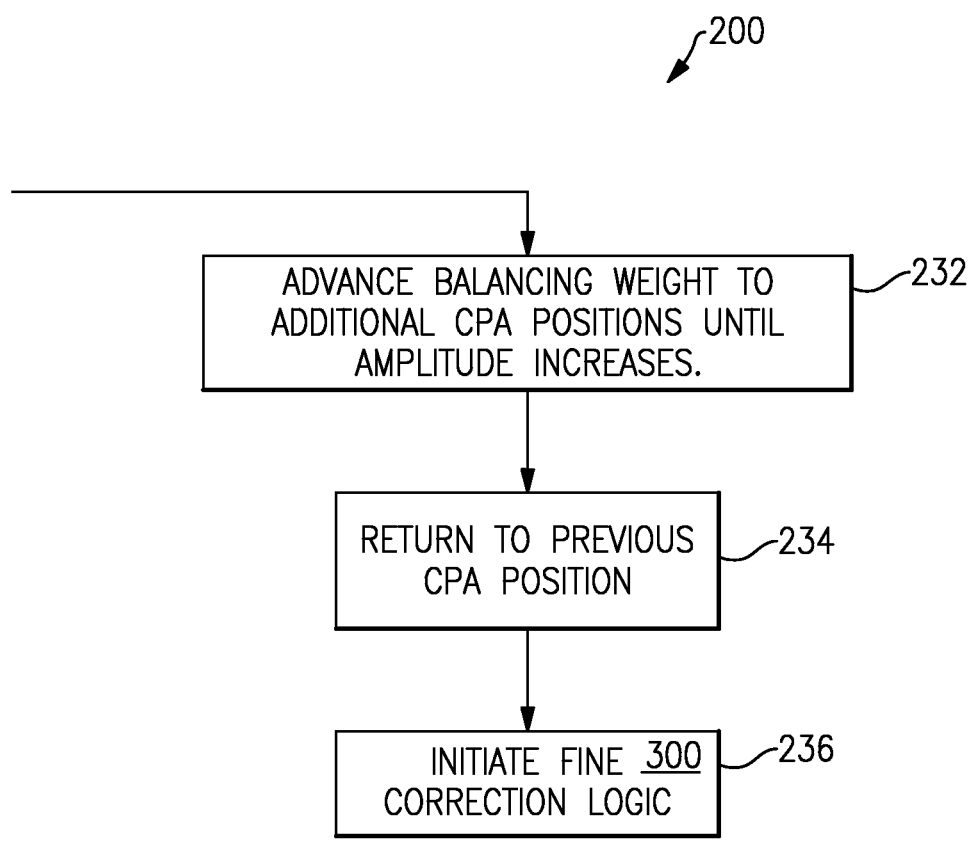
FIG. 6c illustrates a flow diagram of final steps of the coarse balance correction method.

FIGS. 6a-6c show a flow diagram of a coarse balance correction method 200 to balance the propeller assembly 20 using the balancing device 38. Referring to FIG. 6a, an initial imbalance is detected in step 202 and the balancing process is initiated in step 204. The balancing weight 60 is moved to the most radially inboard position within the groove 58 in step 206. In one example, the balancing weight can be moved in a step-wise manner at a variable stepping rate. For instance, step 206 may be performed at a fast stepping rate. The balancing weight 60 is moved by energizing the electrical coils 50, which causes the drive wheel 48 to rotate and the balancing weight 60 to advance through the groove 58.

The initial imbalance is measured in step 208 by determining the amplitude and phase angle of vibrations in the propeller assembly 20 via the vibration sensor 28. The balancing weight 60 is advanced radially outward to a new position at a slow stepping rate in step 210, and the imbalance is measured at each step. The imbalance of the propeller assembly 20 at a step N is compared with the imbalance at the previous step (N−1) in step 214. Steps 210-214 are repeated in step 216 until an inflection in the vibration amplitude is encountered. That is, the vibration amplitude changes from increasing to decreasing as compared to the previous step, or vice versa.

Referring to FIG. 6b, once an inflection in vibration amplitude is encountered in step 216, the vibrations are analyzed to determine if a maximum vibration has been reached in step 218. If yes, a "maximum phase angle reference" condition is initiated in step 220, where a Correction Phase Angle (CPA) position of the balancing weight 60 is determined to be the position at the inflection point plus 180°. In step 222, the balancing weight 60 is advanced to the CPA position at a fast stepping rate.

If the vibration amplitude inflection is not determined to be a maximum in step 218, a CPA condition exists in step 224, where the CPA position of the balancing weight 60 is determined to be the phase angle at the inflection point where the minimum in vibration amplitude occurs. The balancing weight 60 is advanced to a second CPA position 360° from the first CPA position at a fast stepping rate in step 230.

Referring now to FIG. 6c, the balancing weight 60 is continuously advanced to CPA positions (calculated as the current position plus 360°) until the amplitude of vibrations increases from the previous CPA position in step 232. The balancing weight 60 is then returned to the previous CPA position in step 234 and a fine balance correction method 300 for further refinement of the balancing weight 60 position is initiated in step 236.

Figure 7:
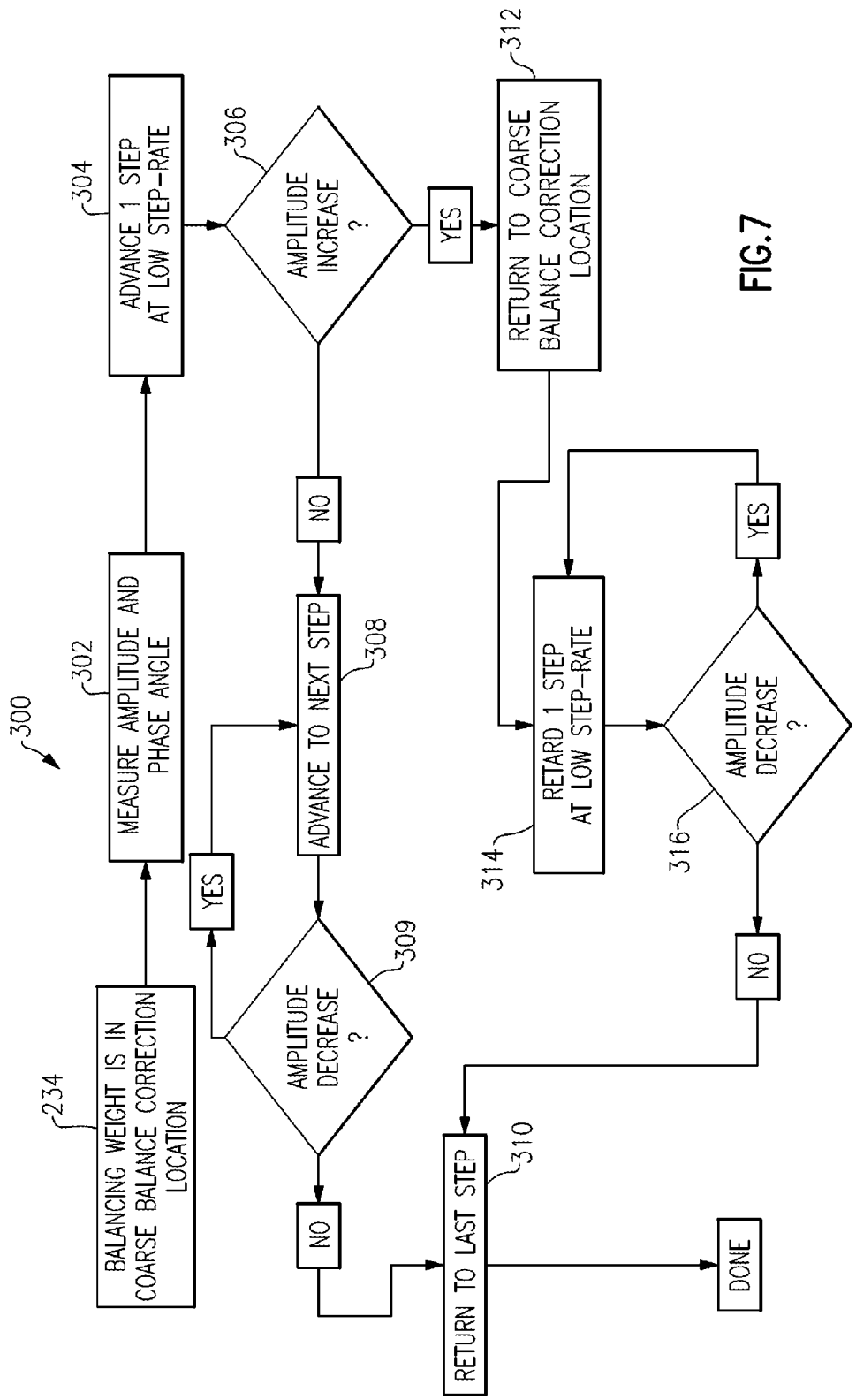
FIG. 7 illustrates a flow diagram of a fine balance correction method.

FIG. 7 shows a flow diagram of the fine balance correction method 300. The balancing weight 60 is in the coarse balance correction location from step 234. The vibration amplitude and phase angle are measured in step 302. The balancing weight is advanced one step at a low stepping rate in step 304. The amplitude of vibrations is measured in step 306 and compared to the previous amplitude measured in step 302. If the amplitude of vibration is not increased, the balancing weight 60 is again advanced one step in step 308. The amplitude of vibration is measured in step 309 and compared to the amplitude at the previous step 306. If amplitude is decreased from this second advance 308, steps 308 and 309 are repeated until the amplitude is not decreased. Then, in step 310, the balancing weight 60 is returned to the previous position and the balancing method is complete.

If the amplitude of vibration is increased in step 306, the balancing weight 60 is returned to the coarse balance correction location in step 312. The balancing weight 60 position is then retarded one step at a low stepping rate in step 314. The amplitude of vibrations is measured in step 316 and compared to the previous amplitude in step 306. If the vibration amplitude is decreased, steps 314 and 316 are repeated. If the amplitude is not decreased, the balancing weight 60 is returned to the previous position in step 310. In this way, vibrations in the propeller assembly 20 are minimized by the balancing device 38.

Although example embodiments have been disclosed, a worker of ordinary skill in this art would recognize that certain modifications would come within the scope of the claims. For that and other reasons, the following claims should be studied to determine their true scope and content.

What is claimed is:
1. A propeller balancing device, comprising:
   at least one stationary outer disc;
   a drive wheel arranged adjacent to the at least one stationary outer disc, the drive wheel including magnets arranged at a periphery of the drive wheel;
   a balancing weight arranged in a groove formed in one of the at least one stationary outer disc and the drive wheel, such that the balancing weight moves through the groove with rotation of the drive wheel including movement in a radial direction with respect to the drive wheel; and an outer ring arranged around the at least one stationary outer disc, and electrical coils arranged at a periphery of the outer ring.

2. The propeller balancing device of claim 1, wherein the groove is spiral shaped.

3. The propeller balancing device of claim 1, wherein the electrical coils are axially aligned with the magnets.

4. The propeller balancing device of claim 1, wherein the electrical coils are energized by an electrical input.

5. The propeller balancing device of claim 1, wherein when the electrical coils are in a de-energized state, the magnets are locked in place.

6. The propeller balancing device of claim 1, wherein the balancing weight includes a ball bearing assembly.

7. The propeller balancing device of claim 6, wherein a pin is disposed through the ball bearing assembly, the drive wheel, and the at least one stationary outer disc.

8. The propeller balancing device of claim 1, wherein the groove is formed in the at least one stationary outer disc.

9. The propeller balancing device of claim 1, wherein the propeller balancing device is operable during flight.

10. The propeller balancing device of claim 1, further comprising a vibration sensor and a controller, the controller operable to respond to the vibration sensor and control the movement of the drive wheel.

11. A propeller rotor, comprising:
a propeller including a plurality of rotor blades mounted on a hub;
a propeller balancing device including at least one stationary outer disc, a drive wheel having a slot arranged adjacent to the at least one stationary outer disc, the drive wheel including magnets arranged at a periphery of the drive wheel, and a balancing weight arranged in a groove of the at least one outer disc and in the slot, such that the balancing weight moves through the groove with rotation of the drive wheel including movement in a radial direction with respect to the drive wheel; and
the groove being spiral shaped.

12. The propeller rotor of claim 11, further comprising an outer ring arranged around the at least one stationary outer disc, and electrical coils arranged at a periphery of the outer ring.

13. A method of balancing a propeller, comprising the steps of:
measuring vibration of a propeller rotor;
moving a balancing weight to a first position based on a coarse balance approximation, the balancing weight arranged in a groove formed in one of at least one stationary outer disc and a drive wheel such that the balancing weight moves through the groove with rotation of the drive wheel including movement in a radial direction with respect to the drive wheel;
detecting an inflection in an amplitude of the vibration;
moving the balancing weight to a second position based on a fine balance approximation including movement in the radial direction with respect to the drive wheel;
moving the balancing weight to the second position based on the fine balance approximation being performed subsequent to detecting the inflection in the amplitude of the vibration; and
the moving steps including the step of energizing a plurality of electrical coils arranged on an outer ring of an outer disc, the electrical coils operable to repel a plurality of magnets at a periphery of a drive wheel arranged adjacent to the outer disc and including the balancing weight arranged in a groove.

14. The propeller balancing device of claim 1, wherein the balancing weight moves in an outward radial direction with respect to the drive wheel with a first direction of rotation of the drive wheel.

15. The propeller balancing device of claim 14, wherein the balancing weight moves in an inward radial direction with respect to the drive wheel with a second direction of rotation of the drive wheel.

16. The method of claim 13, wherein the groove is spiral shaped, such that the movement is along a spiral.

\* \* \* \* \*